United States Patent [19]

Tatani et al.

[11] Patent Number: 5,902,555
[45] Date of Patent: May 11, 1999

[54] WET FLUE GAS DESULFURIZATION PROCESS AND SYSTEM

[75] Inventors: Atsushi Tatani; Kazuaki Kimura; Yoshio Nakayama; Yukio Kitamura, all of Tokyo; Masakazu Onizuka, Hiroshima, all of Japan

[73] Assignee: Mitsubishi Jukogyo Kabushiki Kaisha, Tokyo, Japan

[21] Appl. No.: 08/907,027

[22] Filed: Aug. 6, 1997

Related U.S. Application Data

[62] Division of application No. 08/506,912, Jul. 26, 1995, abandoned.

[30] Foreign Application Priority Data

Aug. 18, 1994 [JP] Japan .................................. 6-194157

[51] Int. Cl.$^6$ .................................................. B01D 53/34
[52] U.S. Cl. ..................... 422/168; 210/151; 210/188; 210/402; 210/526; 422/273; 423/243.01; 423/243.08
[58] Field of Search ........................ 473/243.08, 243.09, 473/243.1, 243.11, 244.07, 244.08; 210/151, 188, 526, 402; 422/168, 273

[56] References Cited

U.S. PATENT DOCUMENTS

3,985,860 10/1976 Mandelik et al. ................. 423/243.08
5,397,549 3/1995 Newman .................................. 423/235
5,662,794 9/1997 Okazoe et al. ........................... 210/188

FOREIGN PATENT DOCUMENTS

0044566A2 1/1982 European Pat. Off. .
2925547 1/1980 Germany .
2163417 2/1986 United Kingdom .

*Primary Examiner*—Gary P. Straub
*Attorney, Agent, or Firm*—Jacobson, Price, Holman & Stern, PLLC

[57] ABSTRACT

A wet flue gas desulfurization process wherein sulfur dioxide present in flue gas is absorbed into a slurry containing a calcium compound, the slurry having sulfur dioxide absorbed therein is oxidized to form a gypsum slurry, and gypsum is separated and recovered from the gypsum slurry, which comprises the steps of dipping a part of a circulating filtering surface of a suction filter into the gypsum slurry so as to cause gypsum to adhere the filtering surface, carrying the gypsum-bearing filtering surface above the surface of the gypsum slurry, sucking out the liquid phase through the filtering surface to form a dehydrated gypsum layer thereon, and removing the gypsum layer from the filtering surface, as well as an apparatus for carrying out this process.

6 Claims, 7 Drawing Sheets

WET FLUE GAS DESULFURIZATION PROCESS AND SYSTEM

This is a divisional of application Ser. No. 08/506,912, filed Jul. 26, 1995 which was abandoned upon the filing hereof;

BACKGROUND OF THE INVENTION

1. Field of the Invention

This invention relates to a wet flue gas desulfurization process wherein sulfur dioxide present in flue gas is absorbed into a slurry containing a calcium compound, the slurry having sulfur dioxide absorbed therein is oxidized to form a gypsum slurry, and gypsum is separated and collected therefrom conveniently and efficiently, and it also relates to a system for carrying out this process.

2. Description of the Related Art

In recent years, wet desulfurization systems of the so-called tank oxidation type have become popular. In these systems, the necessity of an oxidation tower is eliminated by supplying air to the tank of an absorption tower so that a slurry (containing a calcium compound such as limestone) having sulfur dioxide absorbed therein may be oxidized by contact with air. FIG. 8 is a schematic view illustrating an example of a wet lime-gypsum desulfurization system of this type.

This system includes an absorption tower 1 having a tank 2 defined in its lower part. This tank 2 is equipped with a stirring rod 4 supported by a hollow shaft 3 and rotated horizontally by a motor (not shown), air supply pipes 5 extending from hollow shaft 3 and having their open ends 5a below stirring rod 4, and a rotary joint 6 for connecting the proximal end of hollow shaft 3 to an air source. By rotating hollow shaft 3 while supplying air under pressure, air C is supplied from air supply pipes 5 to gas-phase areas created on the back side of the rotating stirring rod 4 and the tail ends of these gas-phase areas are subjected to a scattering phenomenon under the action of vortex forces resulting from the rotation of stirring tank 2. Thus, a large number of substantially uniform minute air bubbles are produced, enabling the air to come into efficient contact with the absorbent slurry having sulfur dioxide absorbed therein and form gypsum by complete oxidation of the absorbent slurry.

More specifically, in this system, untreated flue gas A is introduced into a flue gas inlet section 1a of absorption tower 1 and brought into contact with an absorbent slurry injected from header pipes 8 by means of a circulating pump 7 to absorb and remove sulfur dioxide present in untreated flue gas A. The resulting flue gas is discharged as treated flue gas B from a flue gas outlet section 1b. The absorbent slurry injected from header pipes 8 flows downward through a packing material 9 while absorbing sulfur dioxide, and enters tank 2 where it is oxidized due to contact with a large number of air bubbles produced by the above-described scattering phenomenon while being stirred with stirring rod 4, and then undergoes a neutralization reaction to form gypsum. The predominant reactions occurring in the course of these treatments are represented by the following reaction formulas (1) to (3).

(Reaction in the absorption tower)

$$SO_2 + H_2O \rightarrow H^+ + HSO_3^- \qquad (1)$$

(Reactions in the tank)

$$H^+ + HSO_3^- + 1/2 O_2 \rightarrow 2H^+ + SO_4^{2-} \qquad (2)$$

$$2H^+ + SO_4^{2-} + CaCO_3 + H_2O \rightarrow CaSO_4 \cdot 2H_2O + CO_2 \qquad (3)$$

Thus, the slurry within tank 2 has suspended therein gypsum and a small amount of limestone used as absorbent. This slurry is withdrawn by means of a slurry pump 10 and fed to a thickener 11. Using a slurry pump 11a, the resulting concentrate D is fed to a solid-liquid separator 12 where it is filtered and recovered as gypsum E having a low water content (usually of about 10%). On the other hand, the supernatant liquid F from thickener 11 and the filtrate from solid-liquid separator 12 are conveyed to a filtrate tank 13, where limestone G is added and the resulting mixture is recycled to tank 2 as a part of the absorbent slurry by means of a slurry pump 14.

Moreover, in order to maintain a high degree of desulfurization and a high purity of gypsum during operation, the sulfur dioxide concentration in untreated flue gas A and the pH of the slurry within tank 2 are detected with sensors, and the feed rate of limestone and the feed rate of the absorbent slurry are suitably regulated by means of controllers (not shown). The absorbent slurry is fed from a separate limestone slurry tank (not shown).

Thus, in the conventional wet flue gas desulfurization system, solid-liquid separation equipment comprising a plurality of complicated and large-sized units such as slurry pumps 10 and 11a, thickener 11 and solid-liquid separator 12 (comprising a centrifugal separator, a belt filter, a decanter type centrifugal settler or the like) is used for the purpose of solid-liquid separation of the gypsum slurry. Moreover, filtrate tank 13 and slurry pump 14 are required to decrease the amount of waste water by reusing the separated water. Consequently, it has been strongly desired to achieve a size reduction and simplification of the equipment required for the solid-liquid separation step and thereby further reduce the size of and the installation space for the wet flue gas desulfurization system.

SUMMARY OF THE INVENTION

Accordingly, it is an object of the present invention to provide a wet flue gas desulfurization process and system wherein a solid-liquid separator of small size and simple construction is connected directly to a tank for forming a gypsum slurry subjected to solid-liquid separation, thus making it possible to reduce the size of the solid-liquid separation equipment and simplify the construction thereof and also to achieve a substantial cutdown in equipment cost, construction cost, acquisition cost of required space and the like.

In order to solve the above-described problems, the present invention provides a wet flue gas desulfurization process wherein sulfur dioxide present in flue gas is absorbed into a slurry containing a calcium compound, the slurry having sulfur dioxide absorbed therein is oxidized to form a gypsum slurry, and gypsum is separated and recovered from the gypsum slurry, which comprises the steps of dipping a part of a circulating filtering surface of a suction filter into the gypsum slurry so as to cause gypsum to adhere the filtering surface, carrying the gypsum-bearing filtering surface above a surface of the gypsum slurry, sucking out a liquid phase through the filtering surface to form a dehydrated gypsum layer thereon, and removing the gypsum layer from the filtering surface.

Preferably, the removal of the gypsum layer from the filtering surface is performed by bending the filtering surface or by scraping. Moreover, before removing the gypsum layer from the filtering surface of the suction filter, it is possible to wash the gypsum layer on the filtering surface by sprinkling it with water and then dehydrate the washed gypsum layer by means of the suction filter, and/or to dehydrate the gypsum layer on the filtering surface by compression.

The present invention also provides a wet flue gas desulfurization apparatus comprising an absorption tower for absorbing sulfur dioxide present flue gas into a slurry containing a calcium compound as absorbent in the upper part of the tower and for oxidizing the fallen absorbing fluid in a tank forming the lower part of the tower, and a solid-liquid separator for separating and recovering gypsum from the gypsum slurry within the tank, characterized in that the solid-liquid separator comprises a suction filter defining a filtering surface which circulates while being partially dipped into the gypsum slurry within the tank, causing gypsum to adhere to that part of the filtering surface which is dipped into the gypsum slurry, and sucking out a liquid phase through the filtering surface above the surface of the gypsum slurry to form a dehydrated gypsum layer; and removal means for removing the gypsum layer from the filtering surface.

In one preferred embodiment, the suction separator comprises a rotating drum, a roller mechanism installed in conjunction with the rotating drum, and filter cloth mounted so as to circulate over the circumferential surface of the rotating drum and through the roller mechanism and thereby form the filtering surface, and the removal means comprises a roller mechanism which removes the gypsum layer by bending the filtering surface. In another preferred embodiment, the suction filter comprises a rotating drum defining the filtering surface in its circumferential surface, and the removal means comprises a scraper which removes the gypsum layer formed on the filtering surface of the rotating drum by scraping.

In a still another preferred embodiment, the suction filter is rotatably mounted inside the edge of a sidewall of the tank and equipped with position control means for controlling the vertical position of the suction filter in response to changes in the level of the gypsum slurry so that the depth to which the filtering surface is dipped into the gypsum slurry is kept constant.

Furthermore, the solid-liquid separator may be equipped with a water sprinkler for washing the gypsum layer formed on the filtering surface of the suction filter with water before removing the gypsum layer from the filtering surface, and/or with compression rollers for dehydrating the gypsum layer formed on the filtering surface of the suction filter by compression before removing the gypsum layer from the filtering surface.

According to the wet flue gas desulfurization process in which a suction filter having a circulating filtering surface is used, this circulating filtering surface can successively perform a series of operations including the adhesion of a gypsum slurry, the formation of a gypsum layer, and its dehydration, washing and removal.

DETAILED DESCRIPTION OF THE PREFERRED EMBODIMENTS

Figure 8:
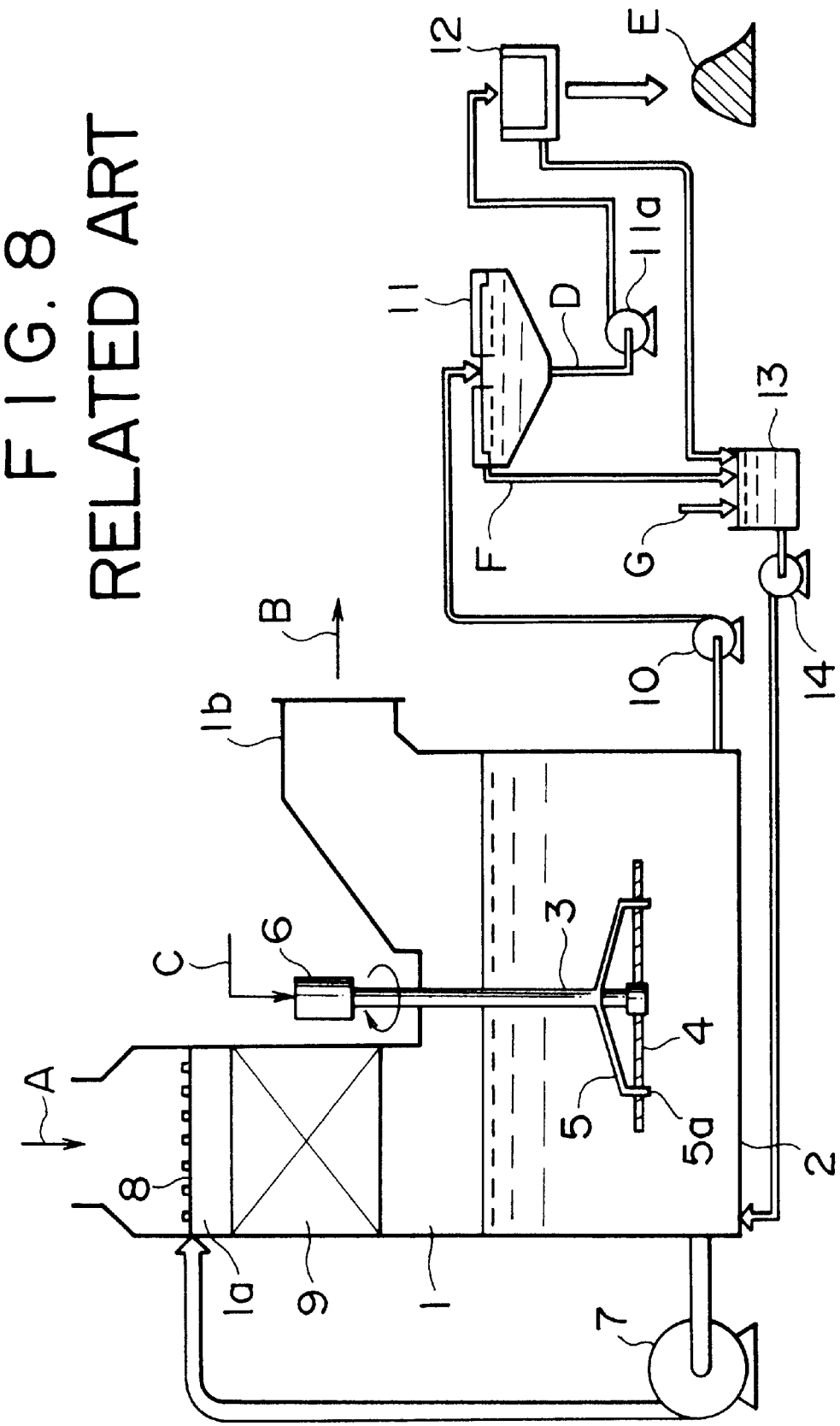
FIG. 8 is a schematic view illustrating an example of a conventional wet flue gas desulfurization apparatus.

In order to clarify the effects of the present invention, preferred embodiments thereof are more specifically described with reference to the accompanying drawings. In the following description, the same elements as described above in connection with the conventional wet flue gas desulfurization apparatus of FIG. 8 are designated by the same reference numerals, and the explanation thereof is omitted or simplified.

(First Embodiment)

Figure 1:
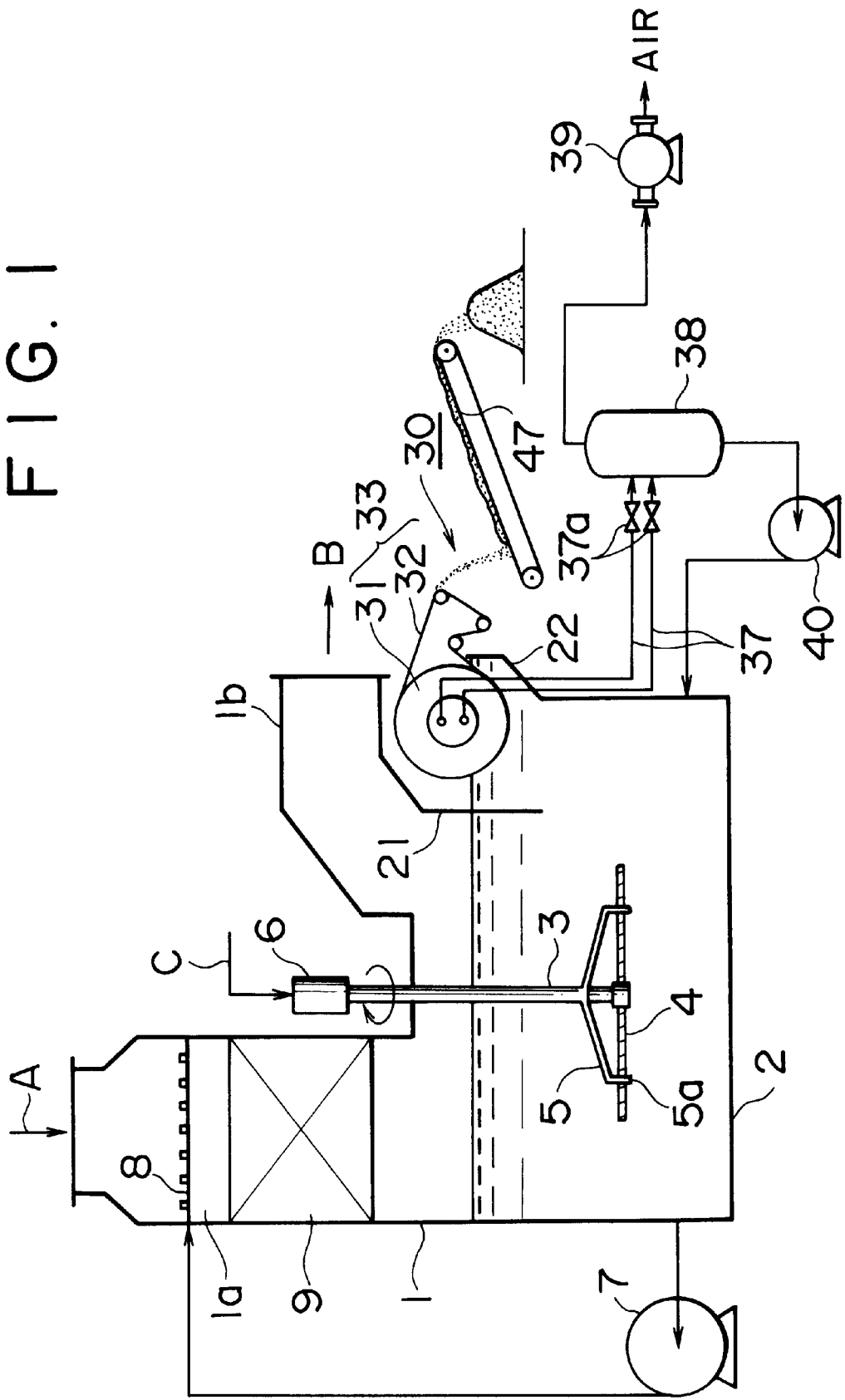
FIG. 1 is a schematic view illustrating the overall construction of a wet flue gas desulfurization apparatus in accordance with a first embodiment of the present invention.
Figure 2:
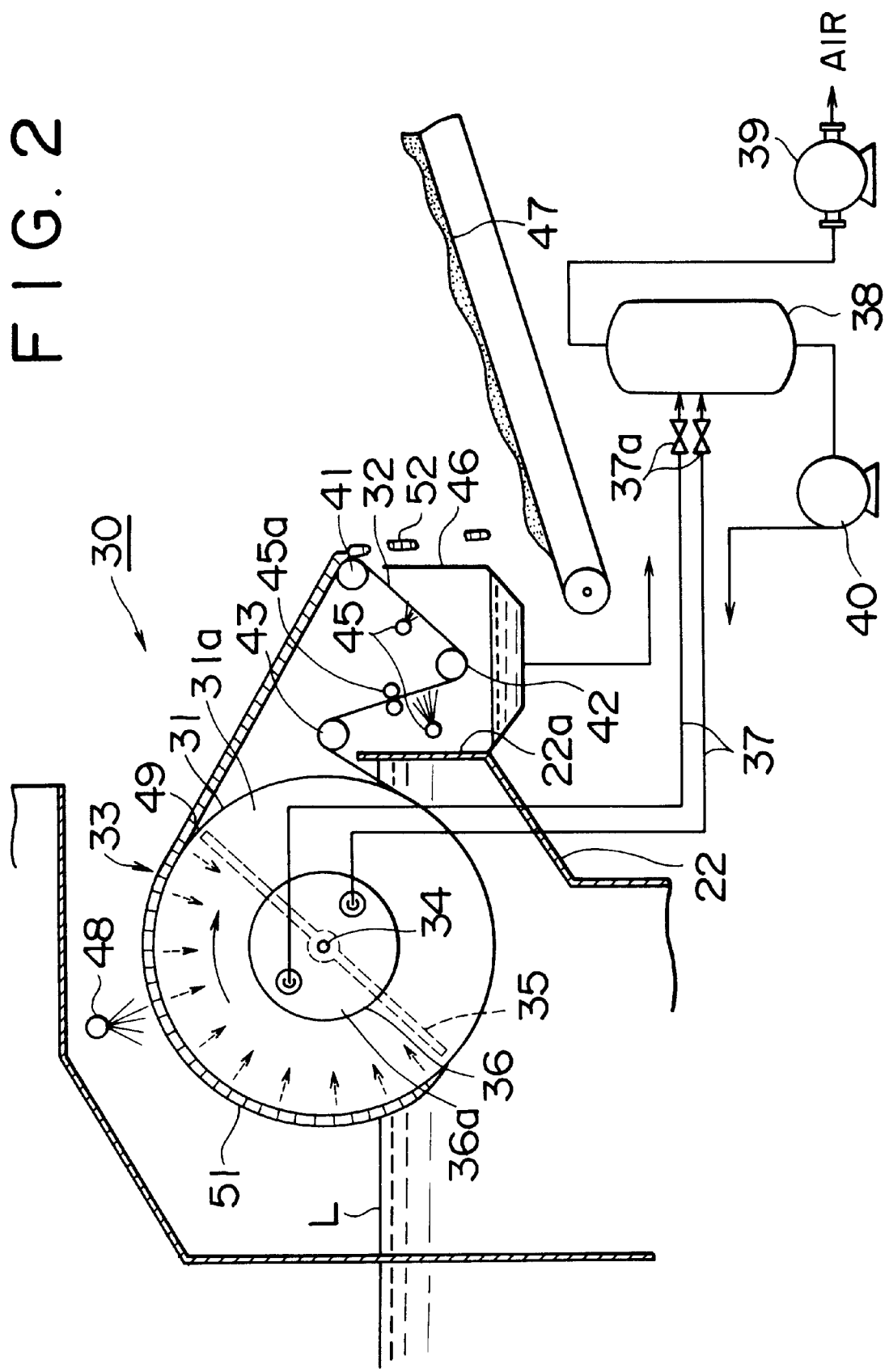
FIG. 2 is an enlarged fragmentary view of the apparatus of FIG. 1, illustrating an essential part thereof including a solid-liquid separator and its surroundings.

FIGS. 1 and 2 illustrate a wet flue gas desulfurization apparatus in accordance with a first embodiment of the present invention. As can be seen in FIG. 1, a solid-liquid separating section 22 is defined on the flue gas discharge side of a tank 2 forming the lower part of an absorption tower 1, and isolated from a flue gas outlet section 1b by a partition wall 21. This solid-liquid separating section 22 is equipped with a solid-liquid separator 30 for separating and collecting gypsum from a gypsum slurry. Partition wall 21 is disposed so as to reach a predetermined depth from the surface of the gypsum slurry, thus dividing solid-liquid separating section 22 from the stirrer side.

As illustrated in FIG. 2, solid-liquid separator 30 includes a suction filter 33 comprising a rotating drum 31 and filter cloth 32 mounted on the surface of rotating drum 31 to form a filtering surface. Rotating drum 31 is disposed inside the edge of a sidewall 22a of solid-liquid separating section 22. Rotating drum 31 has a rotating shaft 34 at its center, and a dividing plate 35 which does not rotate but slides along the inner wall of rotating drum 31 is disposed on rotating shaft 34. Rotating shaft 34 is disposed parallel to the sidewall 22a of solid-liquid separating section 22, and supported in such a position that a part of the circumferential surface of rotating drum 31 is immersed in the gypsum slurry within solid-liquid separating section 22 to a predetermined depth.

Both sides of rotating drum 31 are closed tightly, and one side 31a of rotating drum 31 is provided with a rotary joint 36 which can rotate in a circumferential direction. To the side 36a of this rotary joint 36 are connected two suction pipes 37 for evacuating the inside of rotating drum 31 in order to cause gypsum to adhere to the surface of rotating drum 31 and also to suck out the filtrate therethrough. These suction pipes 37 are connected to a vacuum pump 39 by way of a buffer tank 38. To this buffer tank 38 is connected a filtrate pump 40 for recovering the filtrate collected in the bottom of buffer tank 38. Suction pipes 37 are provided with gate valves 37a on the buffer tank side, so that the part of rotating drum 31 to be evacuated can be changed by operating them.

A roller mechanism is provided on the outside of solid-liquid separating section 22. This roller mechanism consists of a small-diameter discharge roll 41 having its shaft disposed parallel to the shaft 34 of rotating drum 31, a return roll 42 disposed below discharge roll 41, and a take-up roll 43 disposed above return roll 42 and above the sidewall 22a of solid-liquid separating section 22. Filter cloth 32 is mounted so as to circulate over rotating drum 31, discharge roll 41, return roll 42 and take-up roll 43.

Moreover, in order to prevent clogging with gypsum, filter cloth washing water sprinklers 45 for washing the front and back sides of filter cloth 32 with high-pressure water, and an adjuster 45a for correcting any zigzag movement of filter cloth 32 are installed between discharge roll 41 and take-up roll 43. In addition, a washing water receptacle 46 is installed below discharge roll 41, return roll 42 and take-up roll 43, and the washings collected in this receptacle 46 are discharged through a pipeline.

Furthermore, a conveyor belt 47 for conveying the separated and recovered gypsum flakes 52 is installed below discharge roll 41. In addition, a water sprinkler 48 for washing the gypsum attached to the filter cloth is installed in the vicinity of the top of rotating drum 31.

When rotating drum 31 is rotated so as to cause filter cloth 32 to travel from the surface L of the gypsum slurry toward discharge roll 41, filter cloth 32 parts from the drum surface at a parting point 49. Dividing plate 35 is controlled so that suction through the circumferential surface of rotating drum 31 is performed in the region extending from a part thereof dipped into the gypsum slurry to the above-described parting point 49. Thus, suction filter 33 sucks filtrate from the gypsum slurry within solid-liquid separating section 22 only through that part of the circumferential surface of rotating drum 31 which lies in a particular suction region. The liquid phase sucked into rotating drum 31 through the circumferential surface in this suction region is withdrawn from the side 36a of rotary joint 36 through suction pipes 37 by means of filtrate pump 40 and recovered in buffer tank 38.

In this embodiment, the internal space of rotating drum 31 is divided into two compartments by a single dividing plate 35, but the present invention is not limited thereto. That is, the internal space of rotating drum 31 may be divided into a greater number of smaller compartments by a plurality of dividing plates 35, and an optimum suction region may be defined by combining some compartments chosen suitably from among those divisions.

Now, the wet flue gas desulfurization process of the present invention and, in particular, the operation of solid-liquid separator 30 are explained with reference to FIG. 2.

First of all, the shaft 34 of drum 31 is rotated by means of a motor (not shown) and vacuum pump 39 is operated. As a result, the part of rotating drum 31 which lies in the above-described suction region is evacuated and, therefore, filter cloth 32 on the circumferential surface of that part falls into a sucking condition while circulating.

Since the liquid phase is absorbed from that part of the gypsum slurry within solid-liquid separating section 22 into which filter cloth 32 is dipped, the gypsum slurry is concentrated in its vicinity so as to become muddy and cause gypsum to adhere to filter cloth 32. This filter cloth 32 having gypsum attached thereto is carried above surface L while being maintained in a sucking condition. Since suction still continues above surface L, the muddy gypsum is dehydrated to form a gypsum layer 51. When the dehydrated gypsum layer 51 passes under water sprinkler 48, it is washed with a spray of water and the washing water is sucked through filter cloth 32. The washed gypsum layer 51 is further dehydrated by rotating drum 31, parts therefrom at parting point 49, and is conveyed on filter cloth 32 to discharge roll 41. Since discharge roll 41 has a small diameter, filter cloth 32 makes a sharp bend at this site. Gypsum layer 51 cannot follow this bend, so that it separates from filter cloth 32 and falls in the form of gypsum flakes 52. Gypsum can be recovered in this manner.

Thus, the process and apparatus in accordance with this embodiment enable gypsum having a low water content to be recovered by using the solid-liquid separator 30 of very simple construction which is connected directly to tank 2. This makes it possible to eliminate the necessity of complicated and large-sized units such as conventional slurry pumps, thickeners and solid-liquid separators, and thereby achieve a substantial cutdown in equipment cost, construction cost, plot acquisition cost and the like.

(Second embodiment)

Figure 3:
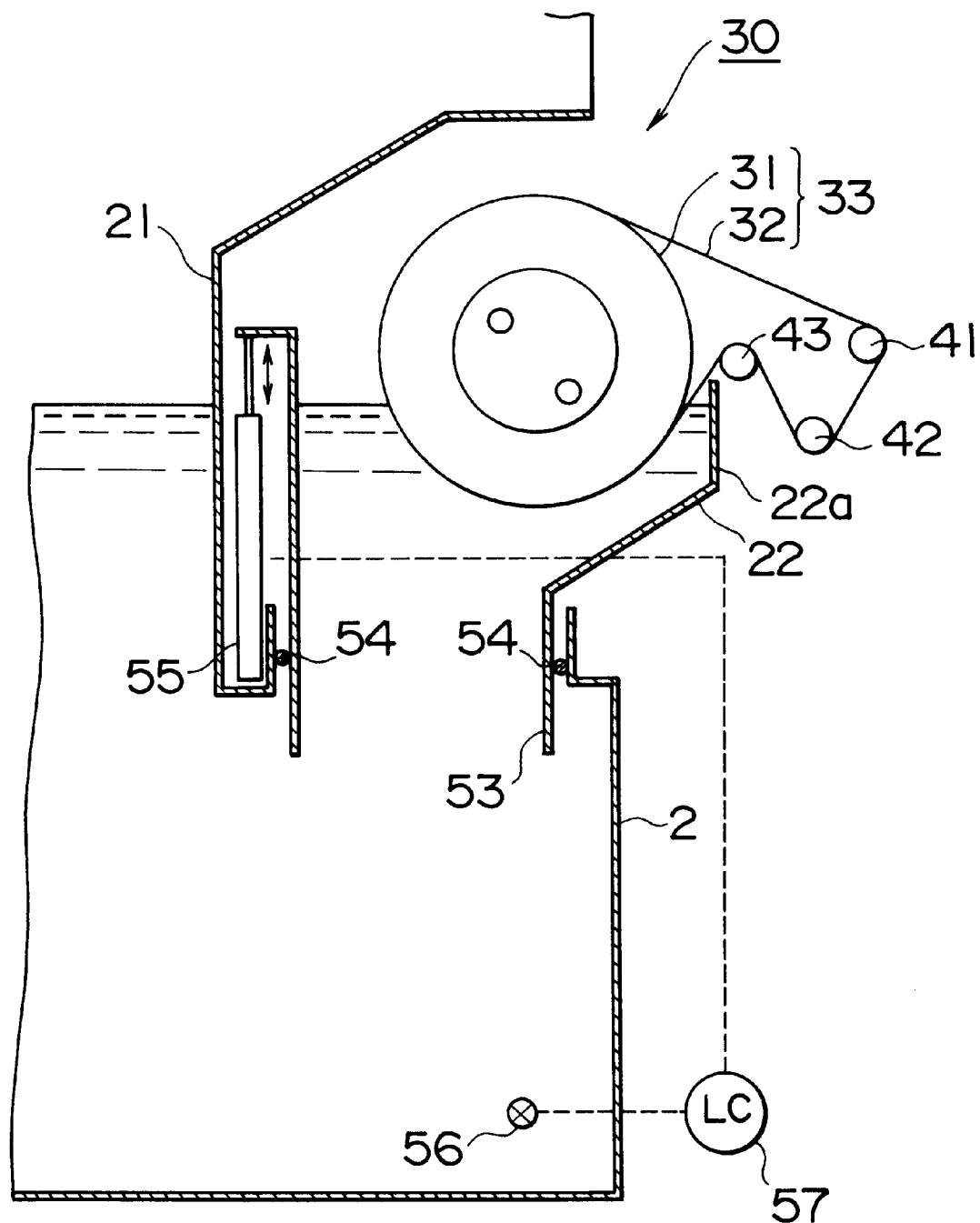
FIG. 3 is an enlarged fragmentary view illustrating a position control means included in a wet flue gas desulfurization apparatus in accordance with a second embodiment of the present invention.

Next, a second embodiment of the present invention is described with reference to FIG. 3. In this second embodiment, solid-liquid separator 30 is installed on the top of an elevator section 53 so as to be vertically movable with respect to tank 2. Elevator section 53 is mounted on tank 2 through the medium of a seal 54. To this elevator section 53 is connected suction filter 33 comprising rotating drum 31, filter cloth 32, and the like. Elevator section 53 is driven by a driving means 55 comprising a hydraulic cylinder, and this driving means 55 is controlled by a level control (or position control means) 57 on the basis of the output of a level sensor 56 for detecting the level of the slurry within tank 2.

More specifically, level control 57 performs servo control of the vertical position of elevator section 53 by controlling driving means 55 with the aid of a hydraulic servo valve (not shown) or the like while detecting the vertical position of elevator section 53 by means of a position detector (not shown) such as potentiometer, so that the optimum relative height of the slurry surface with respect to rotating drum 31 is always secured. Thus, in spite of changes in the level of the gypsum slurry within tank 2, rotating drum 31 can be positioned at an optimum height to achieve efficient separation (and collection) of gypsum.

(Third embodiment)

Figure 4:
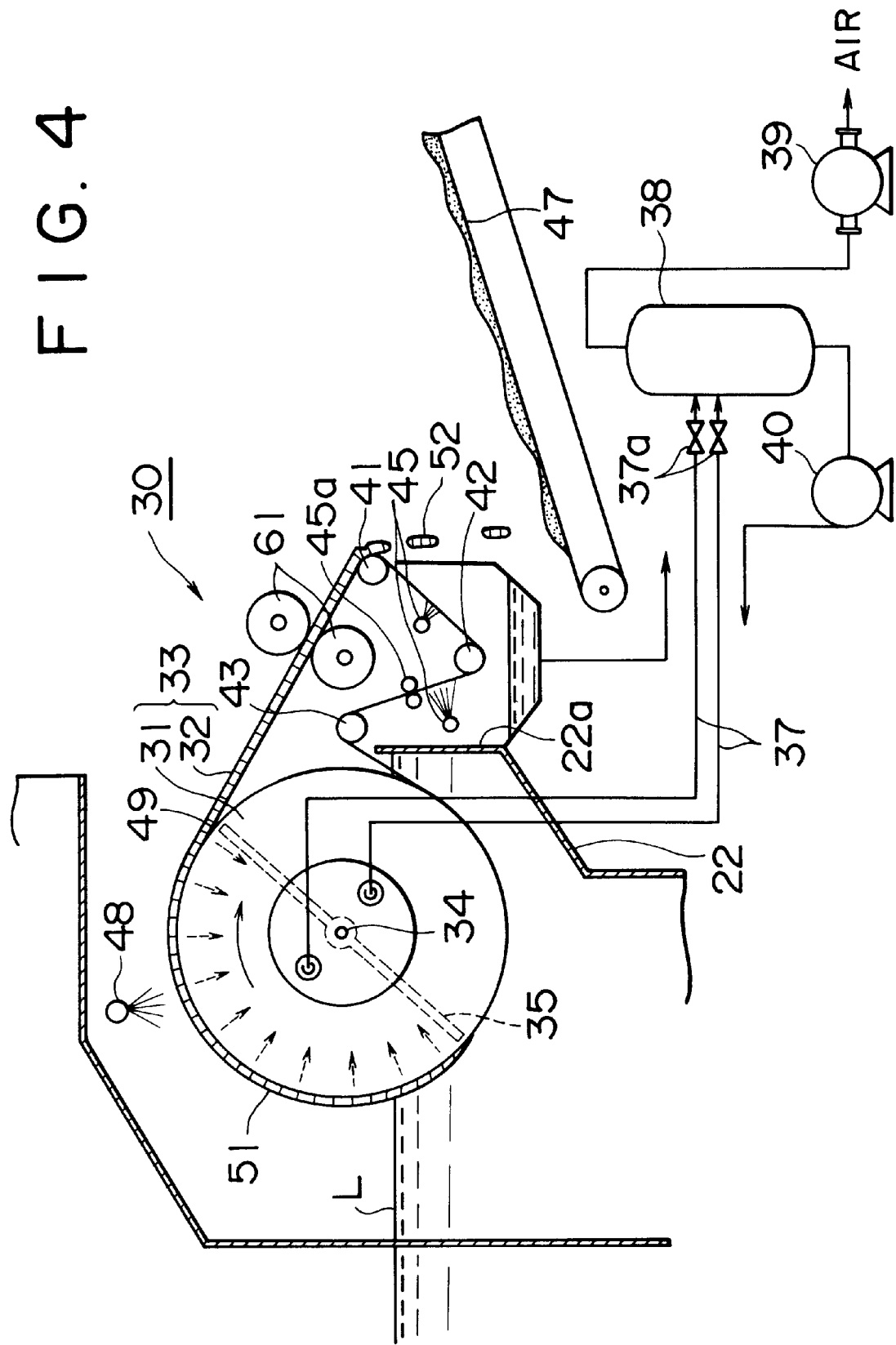
FIG. 4 is an enlarged fragmentary view of a wet flue gas desulfurization apparatus in accordance with a third embodiment of the present invention, illustrating an essential part thereof including a solid-liquid separator and its surroundings.

Next, a third embodiment of the present invention is described with reference to FIG. 4. In this third embodiment, a compression roll assembly 61 comprising a pair of rolls for compressing gypsum layer 51 therebetween together with filter cloth 32 is installed between the parting point 49 and discharge roll 41 of solid-liquid separator 30 in accordance with any of the above-described embodiments.

In the wet flue gas desulfurization apparatus including this solid-liquid separator 30, the gypsum slurry within solid-liquid separating section 22 is sucked by drum 31 under surface L, so that the gypsum slurry is concentrated to cause gypsum to adhere to filter cloth 32. When filter cloth 32 moves above the surface of the gypsum slurry, the gypsum is dehydrated to form a gypsum layer 51. When filter cloth 32 moves farther, this gypsum layer 51 is washed with water by means of a water sprinkler 48 and dehydrated to some degree by suction into drum 31. Then, gypsum layer 51 is conveyed beyond parting point 49 and arrives at compression roll assembly 61, by which gypsum layer 51 is heavily compressed to squeeze out the water present between gypsum particles. Gypsum layer 51 which has been compressed and highly dehydrated is removed from filter cloth 32 and recovered as gypsum flakes 52.

(Fourth embodiment)

Figure 5:
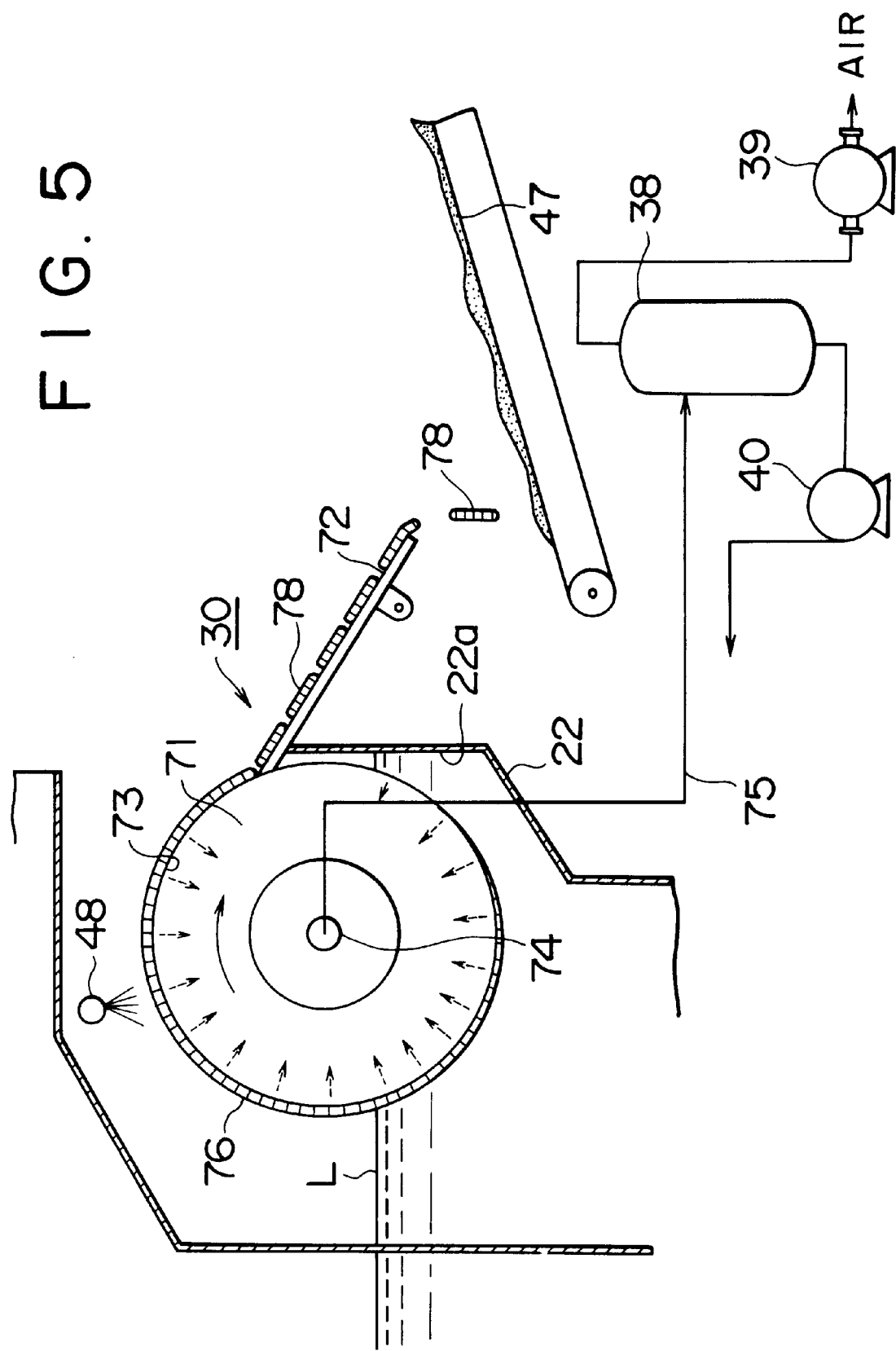
FIG. 5 is an enlarged fragmentary view of a wet flue gas desulfurization apparatus in accordance with a fourth embodiment of the present invention, illustrating an essential part thereof including a solid-liquid separator and its surroundings.

Next, a fourth embodiment of the present invention is described with reference to FIG. 5. In this embodiment, solid-liquid separator 30 has a drum type suction filter 71 and a scraper 72. In this suction filter 71, the surface of the drum forms a filtering surface 73 and both sides of the drum are tightly closed. Filtering surface 73 is circulated by rotating the drum on a hollow shaft 74.

This suction filter 71 is mounted inside the edge of a sidewall 22a of a solid-liquid separating section 22 so that its shaft 74 is parallel to sidewall 22a, and installed in such a way that a part of filtering surface 73 is dipped into the gypsum slurry and, as a result of the rotation of the drum, the filtering surface 73 having gypsum attached thereto is carried above the surface L of the gypsum slurry. The shaft 74 of this suction filter 71 is located above the surface L of the gypsum slurry. Moreover, as described above in connection with the second embodiment, shaft 74 is preferably controlled by a level sensor (not shown) and a position control means (not shown) so that it can move vertically while remaining horizontal and the distance between shaft 74 and surface L is always kept constant. A suction pipe 75 extends from hollow shaft 74 and is connected to a vacuum pump 39 and a filtrate pump 40 by way of a buffer tank 38.

Scraper 72 is a blade-shaped plate extending along a longitudinal line on filtering surface 73, and this blade-shaped plate is pressed against filtering surface 73 under a constant pressure so as to be opposite to the direction of rotation of filtering surface 73. This scraper 72 is located just above that part of surface L with which the rotating filtering surface 73 comes into contact again.

Now, the wet flue gas desulfurization process in accordance with this embodiment and, in particular, the operation of solid-liquid separator 30 are explained below.

First of all, the shaft 74 of suction filter 71 is rotated by means of a motor (not shown) and vacuum pump 39 is operated. As a result, the internal space of the drum of suction filter 71 is evacuated and, therefore, filtering surface 73 falls into a sucking condition while turning. Under these circumstances, the gypsum slurry in solid-liquid separating section 22 comes into contact with that part of filtering surface 73 which is dipped thereinto. Since filtering surface 73 is in a sucking condition, the liquid phase is absorbed and the gypsum slurry is concentrated in the vicinity of filtering surface 73 so as to become muddy and cause gypsum to adhere to filter surface 73. This filtering surface 73 having gypsum attached thereto turns above surface L while being maintained in a sucking condition. Since suction still continues above surface L, the muddy gypsum is dehydrated to form a gypsum layer 76. When the fully dehydrated gypsum layer 76 turns further and reaches the blade of scraper 72, it is scraped and removed from filtering surface 73. The resulting gypsum flakes 78 fall from scraper 72 on a conveyor belt 47 and are conveyed thereby to a predetermined place.

The liquid phase sucked out through filtering surface 73 is withdrawn from hollow shaft 74 and discharged through a suction pipe 75 and a buffer tank 38 by means of a filtrate pump 40. In the same manner as in conventional apparatuses, the discharged aqueous liquid may be mixed with limestone to form a limestone slurry and then recycled to the absorption tower as a part of the absorbent slurry. Since suction filter 71 is controlled so that the distance between shaft 74 and surface L is always kept constant, the depth to which filtering surface 73 is dipped into the gypsum slurry remain constant in spite of changes in the level of surface L. Thus, gypsum formed in solid-liquid separating section 22 is continuously separated and recovered in the form of dehydrated gypsum.

Figure 6:
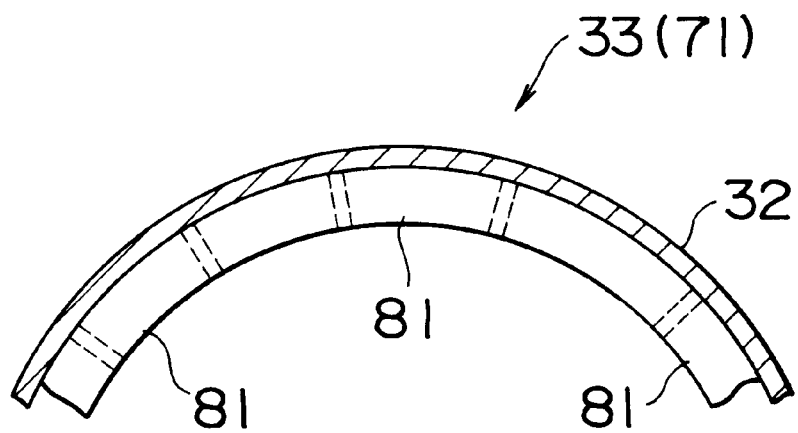
FIG. 6 is an enlarged fragmentary sectional view for explaining the filtering surface, comprising filter cloth, of a suction filter for use in the wet flue gas desulfurization apparatus of the present invention.
Figure 7:
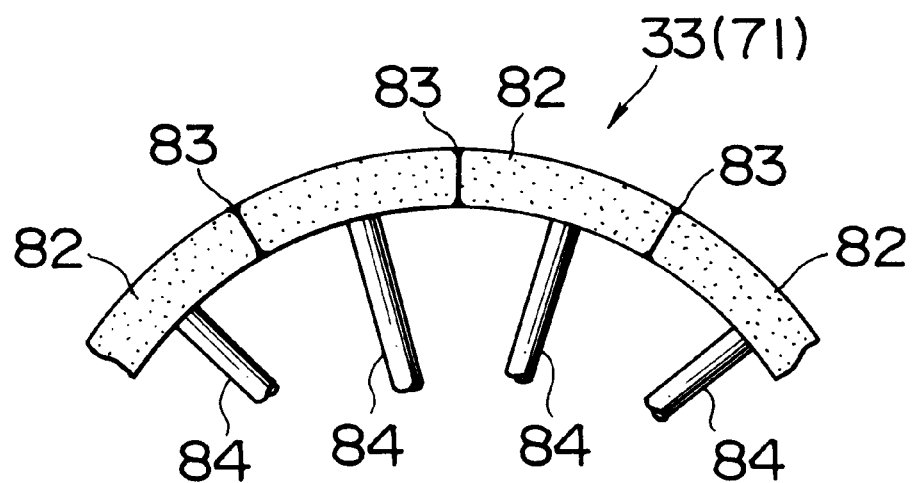
FIG. 7 is an enlarged fragmentary sectional view for explaining the filtering surface, comprising filter blocks, of another suction filter for use in the wet flue gas desulfurization apparatus of the present invention.

In the above-described various embodiments, the material and configuration of filter cloth 32 or filtering surface 73 of suction filter 33 or 71 may be chosen arbitrarily. For example, as shown in FIG. 6, filter cloth 32 may be spread over a longitudinally extending frame 81 formed on the circumferential surface of the drum. Alternatively, as shown in FIG. 7, there may be employed another configuration in which a plurality of longitudinally extending filter blocks 82 are arranged on the circumferential surface of the drum, the boundaries between filter blocks 82 are sealed with sealant 83, these filter blocks 82 are separately fitted with suction pipes 84, and these suction pipes 84 are connected to vacuum pump 39 by way of suction pipe 75.

Since the wet flue gas desulfurization process of the present invention comprises the steps of dipping a part of a circulating filtering surface of a suction filter into the gypsum slurry so as to cause gypsum to adhere to the filtering surface, carrying the gypsum-bearing filtering surface above the surface of the gypsum slurry, sucking out the liquid phase through the filtering surface to form a dehydrated gypsum layer thereon, and removing the gypsum layer from the filtering surface, highly pure gypsum can be separated and recovered directly from the gypsum slurry within the tank by using small-sized and easy-to-operate equipment. Accordingly, the wet flue gas desulfurization apparatus of the present invention which is based on the above-described process is a compact apparatus including a solid-liquid separator connected directly to the tank of the absorption tower. This apparatus does not require a large number of units or a large installation space for purposes of gypsum separation and, therefore, can achieve a substantial cutdown in equipment cost, construction cost, plot acquisition cost and the like, thus contributing to the popularization of desulfurization systems and an increase of demand therefor.

Especially where the apparatus is equipped with a level controller for raising or lowering the solid-liquid separator in response to the level of the slurry within the tank, efficient solid-liquid separation can be performed in spite of changes in the level of the gypsum slurry within the tank, so that not only a reduction in cost and installation space can be achieved, but also easy operating conditions of the system and high reliability of its operation can be secured.

We claim:

1. A wet flue gas desulflurization apparatus comprising:
   an absorption tower comprising an upper region and a lower region, the absorption tower for absorbing sulfur dioxide present in a flue gas into a slurry containing a calcium compound as an absorbent in the upper region of the absorption tower,
   a stirring tank defined in the lower region of the absorption tower for oxidizing the slurry having sulfur dioxide absorbed therein thereby forming a gypsum slurry, wherein the stirring tank is equipped with a stirrer for stirring the slurry; and
   a solid-liquid separator for separating and recovering gypsum from the gypsum slurry within the stirring tank, wherein the solid-liquid separator comprises a suction filter defining a filtering surface which circulates, while being partially within and contacting the gypsum slurry, in the stirring tank so that gypsum adheres to that part of the filtering surface which is within and contacting the gypsum slurry, and which removes the liquid phase through the filtering surface, above the surface of the gypsum slurry to form a gypsum layer; and removal means for removing the gypsum layer from the filtering surface, wherein said suction filter is positioned directly above the tank near the surface level of the slurry within the tank.

2. The wet flue gas desulfurization apparatus as claimed in claim 1 wherein the suction filter comprises a rotating drum having a circumferential surface, a roller mechanism installed in conjunction with the rotating drum, and filter cloth mounted so as to circulate over the circumferential surface of the rotating drum and through the roller mechanism and thereby forming the filtering surface; and the removal means comprises a roller mechanism which removes the gypsum layer by bending the filtering surface.

3. The wet flue gas desulfurization apparatus as claimed in claim 1 wherein the suction filter comprises a rotating drum having a circumferential surface defining the filtering surface, and the removal means comprises a scraper which removes the gypsum layer formed on the filtering surface of the rotating drum by scraping.

4. The wet flue gas desulfurization apparatus as claimed in claim 1 wherein the suction filter is rotatably mounted inside an edge of a sidewall of the tank and equipped with position control means for controlling the vertical position of the suction filter in response to changes in the level of the gypsum slurry so that the depth to which the filtering surface is within the gypsum slurry is kept constant.

5. The wet flue gas desulfurization apparatus as claimed in claim 1 wherein the solid-liquid separator is equipped with a water sprinkler for washing the gypsum layer formed on the filtering surface of the suction filter with water before removing the gypsum layer from the filtering surface.

6. The wet flue gets desulfurization apparatus as claimed in claim 1 wherein the solid-liquid separator is equipped with compression rollers for dehydrating the gypsum layer formed on the filtering surface of the suction filter by compression before removing the gypsum layer from the filtering surface.

* * * * *